United States Patent [19]
Buck

[11] 3,807,259
[45] Apr. 30, 1974

[54] DRAW-BAR ACTUATOR

[75] Inventor: James R. Buck, Ross Township, Kalamazoo City, Mich.

[73] Assignee: Buck Tool Company, Kalamazoo, Mich.

[22] Filed: Oct. 26, 1972

[21] Appl. No.: 301,227

[52] U.S. Cl. .................................. 82/30, 279/4
[51] Int. Cl. ..................... B23b 19/02, B23b 5/22
[58] Field of Search .......................... 29/30; 279/4

[56] References Cited
UNITED STATES PATENTS

| | | | |
|---|---|---|---|
| 3,592,090 | 7/1971 | Koopman | 82/30 |
| 3,148,889 | 9/1964 | Frel | 279/4 |
| 3,498,618 | 3/1970 | Hultgren | 279/4 |
| 3,361,433 | 1/1968 | Holdridge | 279/4 |
| 3,002,496 | 10/1961 | Manchester | 279/4 |
| 2,812,186 | 11/1957 | Carlsen et al. | 279/4 |
| 2,809,612 | 10/1957 | Highberg | 279/4 |
| 3,625,530 | 12/1971 | Parsons | 279/4 |
| 2,782,044 | 2/1957 | Gabriel et al. | 279/4 |
| 2,793,040 | 5/1957 | Wilson | 279/4 |
| 3,174,765 | 3/1965 | Atherholt, Jr. | 279/4 |

Primary Examiner—Harrison L. Hinson
Attorney, Agent, or Firm—Woodhams, Blanchard & Flynn

[57] ABSTRACT

An improved draw bar actuator adapted to be mounted on a machine tool, particularly a lathe, having a rotatable chuck structure connected to a drive spindle and having a draw bar extending coaxially within the spindle and connected to the jaws of the chuck structure for moving same. The draw bar actuator includes first and second spaced bearing assemblies which are supported on the free ends of the spindle and draw bar, respectively. An axially extendible power unit, particularly a fluid pressure cylinder, is positioned between and axially interconnected to the first and second bearing assemblies for causing axial movement of the draw bar relative to the spindle. Each bearing assembly includes inner and outer races separated by anti-friction bearing members, the inner races being connected respectively to the spindle and draw bar, and the outer races being nonrotatably interconnected to the power unit. The power unit is maintained in a nonrotatable condition by the conduits connected thereto which supply pressure fluid to the cylinder.

5 Claims, 3 Drawing Figures

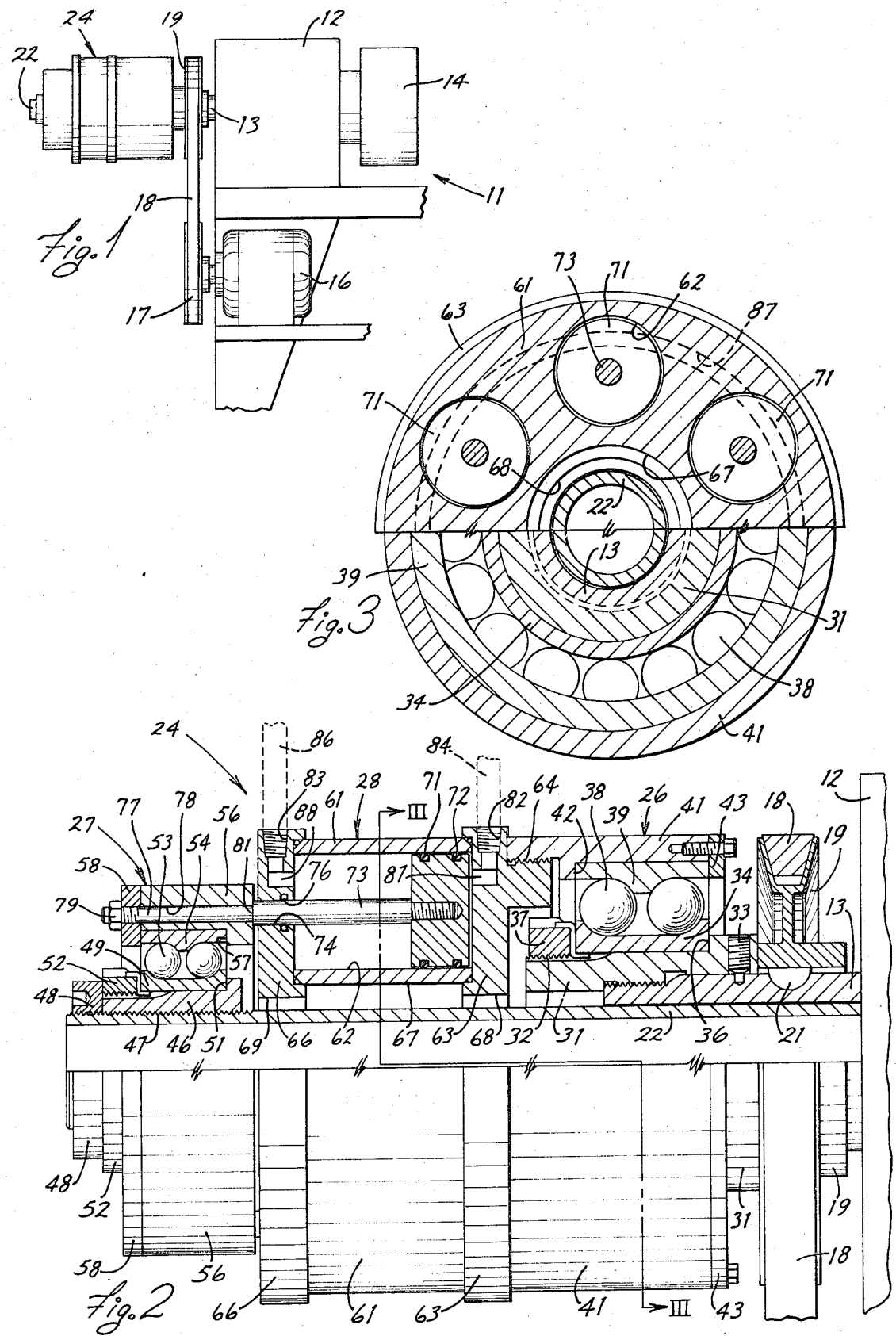

DRAW-BAR ACTUATOR

FIELD OF THE INVENTION

This invention relates to a draw bar actuator for a chuck structure and, in particular, to an improved draw bar actuator adapted to be mounted on a machine tool, such as a lathe, for permitting axial displacement of the draw bar relative to the driving spindle.

BACKGROUND OF THE INVENTION

Lathes are often provided with a conventional chuck structure mounted on the face plate of the lathe headstock for permitting gripping of a workpiece. The face plate of the headstock is in turn connected to a hollow driving spindle which extends through the headstock housing and has the outer end thereof interconnected to a drive motor by means of a suitable drive connection, such as a gear or belt transmission. Further, the jaws of the rotatable chuck are movably actuated by means of a draw bar which is disposed within and is axially movable relative to the spindle. To permit axial movement of the draw bar and a corresponding movement of the chuck jaws, the lathe is provided with a draw bar actuating device disposed in surrounding relationship to the free end of the draw bar, which draw bar actuating device often comprises a fluid pressure cylinder. Since the draw bar rotates with the spindle, it has been conventional practice to mount all or at least part of the fluid pressure cylinder for rotation with the draw bar. For example, in one known structure, the fluid pressure cylinder has been mounted in surrounding relationship to the free end of the draw bar and has had the cylinder housing stationarily mounted while the piston slidably disposed within the cylinder housing has been nonrotatably connected to the free end of the draw bar. This structure results in the piston being rotatably movable within the cylinder, thereby requiring the provision of a rotary seal between the piston and the surrounding cylinder housing. Such seals require substantial maintenance and replacement and thus are undesirable.

It is also known to mount the complete piston and cylinder for rotation with the draw bar, which structure requires that a rotating seal be coupled to the fluid pressure cylinder for enabling pressure fluid to be supplied to the cylinder from a stationary external source. These rotary seals, however, increase the overall mechanical complexity of the device and require increased maintenance and repair.

A further disadvantage associated with structures of the above type is due to the centrifugal pressure created on the fluid within the cylinder due to the rotation of same. Particularly, when the fluid pressure cylinder is connected to the draw bar for rotation therewith, the rotation of the cylinder causes the fluid within the cylinder to be subjected to centrifugal force, which in turn effects the pressure of the fluid. Since the rotational speed of the draw bar is variable, the effect of centrifugal force on the fluid pressure is likewise variable, so that the pressure of the fluid within the actuating cylinder is thus in part dependent upon the rotational speed of the spindle and draw bar. Thus, maintaining a precise pressure level within the cylinder is extremely difficult.

Thus, it is an object of the present invention to provide an improved draw bar actuator which overcomes the above-mentioned disadvantages. Particularly, it is an object of the present invention to provide:

1. An improved draw bar actuator having a central opening therethrough through which the draw bar may project.

2. A draw bar actuator, as aforesaid, which is mounted between the free ends of the spindle and draw bar and is isolated from the rotation of same, whereby the actuator may be mounted in a nonrotatable manner.

3. A draw bar actuator, as aforesaid, which includes a fluid pressure cylinder which is nonrotatable so that the pressure of the fluid is independent of the rotational speed of the spindle and draw bar.

4. A draw bar actuator, as aforesaid, which does not require any rotating seals associated with the fluid pressure cylinder.

5. A draw bar assembly, as aforesaid, which includes a first anti-friction bearing assembly coacting between one end of the fluid pressure cylinder and the free end of the rotating spindle, and a second anti-friction bearing assembly coacting between the other end of the fluid pressure cylinder and the free end of the draw bar for enabling the fluid pressure cylinder to be maintained in a nonrotatable condition.

6. A draw bar actuator, as aforesaid, wherein the fluid pressure cylinder includes fluid pressure means disposed in a circular pattern surrounding the draw bar and operatively axially connected between the free ends of the spindle and the draw bar for enabling axial displacement of the draw bar relative to the spindle. Said fluid pressure means may be a plurality of separate cylinders or a single annular cylinder, as desired.

7. A draw bar actuator, as aforesaid, which can be readily mounted on and adapted to conventional lathes.

8. A draw bar actuator, as aforesaid, which occupies a minimum of space, which possesses a minimum number of seals, which can be manufactured efficiently and economically, and which requires a minimum amount of maintenance and repair.

These and other objects of the invention will be apparent to persons acquainted with devices of this type upon reading the following specification and inspecting the accompanying drawings.

BRIEF DESCRIPTION OF THE DRAWINGS

FIG. 1 is a fragmentary elevational view of a portion of a lathe and particularly illustrating the headstock of the lathe together with the draw bar actuator of the present invention.

FIG. 2 is an enlarged view of the draw bar actuator constructed according to the present invention, same being illustrated as a half central sectional view.

FIG. 3 is a sectional view taken substantially along the line III—III in FIG. 2.

Certain terminology will be caused in the following description for convenience in reference only and will not be limiting. The words "upwardly," "downwardly," "leftwardly" and "rightwardly" will refer to directions in the drawings to which reference is made. The words "inwardly" and "outwardly" will refer to directions toward and away from, respectively, the geometric center of the device and designated parts thereof. The word "inwardly" will also refer to inward movement of the draw bar relative to the lathe, which inward movement is rightwardly in FIGS. 1 and 3, and the word "outwardly" will refer to movement of the draw bar outwardly of the lathe, which movement is leftwardly in FIGS. 1 and 2. Said terminology will include the words above specifically mentioned, derivatives thereof and words of similar import.

SUMMARY OF THE INVENTION

The objects and purposes of the present invention, including those set forth above, are met by providing a draw bar actuator which surrounds the free end of the draw bar and is supported on the free end of the spindle, which spindle is concentric with and surrounds the draw bar and terminates at an axial distance spaced from the free end of the draw bar. The draw bar actuator includes a first anti-friction bearing assembly for supporting same on the free end of the rotatable spindle, and includes also a second anti-friction bearing assembly for supporting same on the free end of the rotary draw bar. The bearing assemblies enable the draw bar actuator to be maintained in a nonrotatable condition. The actuator includes a fluid pressure cylinder connected between the first and second bearing assemblies for permitting axial movement of the draw bar relative to the spindle independent of the rotation of the spindle and draw bar.

DETAILED DESCRIPTION

FIG. 1 illustrates therein the headstock end of a conventional lathe 11, which headstock includes a housing 12 which rotatably supports a drive spindle 13 which at its inner end is connected to a rotatable chuck assembly 14. The chuck assembly 14 may be of any conventional construction wherein the jaws are moved, at least partially in a radial direction, for engaging a workpiece due to axial displacement of a draw bar 22 which is slidably supported within the spindle 13. The chuck assembly 14 may be of the type illustrated in U.S. Pat. No. 3,252,710, if desired.

The lathe 11 is provided with a drive motor 16 mounted thereon which, by means of a suitable power transmission, such as either a belt drive or a gear drive, is connected to the rotatable spindle 13 for driving same. In the illustrated embodiment, the motor 16 is provided with a drive pulley 17 which, through an intermediate belt 18, drives a driven pulley 19 which is nonrotatable secured to the rotatable spindle 13, as by means of a key 21.

The spindle 13 slidably supports therein the draw bar 22 which, as illustrated in FIG. 2, extends outwardly a substantial distance beyond the outer end of the spindle 13. The free ends of the spindle 13 and draw bar 22 are interconnected by a draw bar actuator 24 constructed according to the present invention. The draw bar actuator, wyen energized, causes axial displacement of the draw bar 22 relative to the spindle 13 for causing appropriate movement of the jaws provided on the chuck assembly 14.

Considering now the draw bar actuator 24, as illustrated in detail in FIG. 2, same includes a first anti-friction bearing assembly 26 for supporting the actuator on the free end of the spindle 13. A second anti-friction bearing assembly 27 is axially spaced from the first bearing assembly 26 and is interconnected to the free end of the draw bar 22. A power unit 28 surrounds the draw bar 22 and extends axially between the bearing assemblies 26 and 27 for enabling axial displacement of the draw bar 22 relative to the spindle 13.

The first anti-friction bearing assembly 26 includes an annular inner bearing carrier 31 which is fixedly connected, as by threads 32, to the free end of the spindle 13. The inner bearing carrier 31 is additionally fixedly connected to the spindle 13 as by a set screw 33. The inner bearing carrier 31 has an inner annular bearing race 34 nonrotatably seated thereon, which inner race 34 is axially confined between a shoulder 36 and a lock nut 37. Two sets of conventional ball bearings 38 are rotatably supported on the inner race 34 and are also rotatably confined within an annular outer race 39 which is fixedly seated within an annular outer bearing carrier 41, the race 34 being retained between a shoulder 42 and a retaining ring 43.

The second anti-friction bearing assembly 27 is of a construction similar to the first bearing assembly 26 and includes an inner annular bearing carrier 46 disposed in surrounding relationship to the free end of the draw bar 22 and fixedly connected thereto, as by means of threads 47. A lock nut 48 is threadedly mounted on the free end of the draw bar 22 for retaining the inner bearing carrier 46 thereon. An annular inner bearing race 49 surrounds and is fixedly seated on the inner bearing carrier 47, being axially retained between a shoulder 51 and a lock nut 52. The inner bearing race 49 rotatably supports a pair of conventional ball bearings 53 which are confined within an outer annular bearing race 54. Outer bearing race 54 is nonrotatably secured to an outer annular bearing carrier 56 and is confined between a shoulder 57 and a bearing retainer 58.

The outer bearing carriers 41 and 56 are axially interconnected by the power unit 28 which includes a fluid pressure cylinder for permitting relative axial displacement between the outer bearing carriers 41 and 56. In the illustrated embodiment, the power unit includes a plurality of circumferentially spaced, fluid pressure cylinders and for this purpose includes a ringlike cylinder member 61 disposed in surrounding relationship to the draw bar 22. The cylinder member 61 has a plurality of circumferentially spaced cylindrical bores 62 extending therethrough. A cylindrical end cap 63 is fixedly and sealingly secured to one end of the cylinder member 61 and is also fixedly secured to the outer bearing carrier 41, as by means of threads 64. The other end of the cylinder member 61 is also sealingly closed and fixedly connected to a similar cylindrical end cap 66. The cylinder member 61, end cap 63 and end cap 66 have aligned central openings 67, 68 and 69 therein, respectively, which openings enable the draw bar 22 to freely and movably extend therethrough.

Each of the cylinder bores 62 has a piston 71 slidably disposed therein for movement in a direction substantially parallel to the axis of the draw bar 22. Each piston 71 is provided with suitable resilient seal rings 72 thereon for sealing engagement with the walls of the respective bore 62. An elongated piston rod 73 is fixedly secured to each piston 71 and extends outwardly through an opening 74 formed in the end cap 66, being slidably and sealingly supported by a conventional elastomeric seal ring 76.

The outer end of each piston rod 73 is provided with a reduced diameter rod portion 77 which extends through a longitudinally extending opening 78 formed in the outer bearing carrier 56 and bearing retainer 58. The free end of the piston rod 73 is threaded and has a nut 79 secured thereto for retaining the outer bearing carrier 56 between the nut 79 and the shoulder 81 as formed on the piston rod at the junction between the large and small diameter portions thereof.

The cylindrical end caps 63 and 66 are formed with ports or passages 82 and 83 therein, respectively, which passages are in turn connected to suitable conduits 84 and 86 which are associated with an externally located fluid pressure system, such as a motor-pump unit and a reservoir, for enabling pressure fluid, such as pressurized hydraulic fluid, to be supplied to and withdrawn from either end of the bores 62 to thus enable the pistons 71 to be moved in opposite directions. The several cylinders 71 may be connected by passageways 87 and 88 as shown or, if preferred, they may each be supplied by separate conduits 84 and 86 with the passageways 87 and 88 omitted. The power unit 28 thus functions as a conventional double-acting fluid pressure cylinder for permitting axial movement of the draw bar 22 either inwardly or outwardly relative to the spindle 13 for causing a corresponding movement of the jaws associated with the chuck structure 14.

It will be observed that the inner and outer bearing races 34 and 39, and the ball bearings 38 disposed therebetween, comprise a conventional double-row angular contact ball bearing. The inner and outer bearing races 49 and 54 and the ball bearings 53 disposed therebetween also comprise a conventional double-row angular contact ball bearing. Thus, further description of these bearings is not believed necessary since it is well known that bearings of this type are capable of transmitting both axially and radially directed forces.

OPERATION

The operation of the present invention will be briefly described to insure a complete understanding thereof.

When the lathe 11 is being used for holding a workpiece, the workpiece will be clampingly held by the plurality of jaws as movably mounted on the rotatable chuck structure 14. The jaws are moved into clamping engagement with the workpiece due to axial displacement of the draw bar 22 relative to the spindle 13. Assuming that the jaws of the chuck structure 14 are moved radially inwardly into engagement with the workpiece due to an axial outward movement of the draw bar 22, and assuming further that the jaws are in their radially outermost positions, then the jaws will be moved radially inwardly into clamping engagement with the workpiece by means of the actuator assembly 24. For this purpose, pressure fluid will be supplied through conduit 84 and through passage 82 into the rightward ends of the bores 62. The pressure fluid as supplied to the plurality of bores 62 will cause the plurality of pistons 71 to be moved (leftwardly in FIG. 2) to cause the piston rods 73 to be extended. The extension of the piston rods 73 causes the outer bearing carrier 54 to likewise be moved axially relative to the spindle 13 (leftwardly in FIG. 2). The axial displacement of bearing carrier 56 will be transmitted through the outer bearing race 54, the balls 53 and the inner bearing race 49 to the inner bearing carrier 46. The inner bearing carrier 46 and the draw bar 22 attached thereto will thus likewise be displaced axially outwardly relative to the spindle 13, thereby causing the desired movement of the chuck jaws.

Since the chuck construction 14 and spindle 13 are rotated during the desired machining operation, which rotation is caused by the belt transmission 17, 18 and 19, this rotation is not transmitted to the power unit 28 due to the intermediate ball bearings 38. Rather, the power unit 28 is maintained in a nonrotatable condition due to the interconnection of the power unit to external stationary structure, as by means of the intermediate rigid conduits 84 and 86. The power unit 28 and outer bearing races 56 and 41 connected thereto thus remain stationary, even when the spindle 13 is rotated.

Since the draw bar 22 may or may not be rotated, depending upon the type of connection provided between the draw bar and the clutch jaws, the draw bar actuator 24 of the present invention is also provided with the anti-friction bearing assembly 27 disposed between the power unit 28 and the draw bar 22, whereby the draw bar 22 is thus free to rotate while still enabling the power unit 28 to remain in a nonrotatable condition. Since the power unit 28 is thus maintained in a nonrotatable condition, all of the connections and seals associated with the power unit can be of conventional construction, thereby eliminating the need for any rotary slip seals and the like.

Further, due to the manner in which the bearing assemblies 26 and 27 are supported on the free ends of the spindle 13 and draw bar 22, respectively, the draw bar actuator 24 can be disposed concentric with and in surrounding relationship to the free end of the draw bar 22, and can be mounted in a very compact space in the region between the free ends of the spindle 13 and draw bar 22. Further, the actuator 24 can be easily adapted to existing lathes merely by modifying the inner bearing races 46 and 31 to accommodate same to the ends of the spindle 13 and/or draw bar 22.

While the embodiment of the invention as illustrated and described utilizes bores 62 and pistons 71 disposed in a circular pattern in surrounding relationship to the draw bar 22, it will be recognized that the number of individual fluid pressure cylinders as formed within the common cylinder member 61 can be varied as desired. Further, rather than utilizing a plurality of circumferentially spaced small fluid pressure cylinders, the present invention could also utilize a single fluid pressure cylinder having a ring-like piston disposed within a single ring-like bore formed concentric with and surrounding the draw bar. However, use of a plurality of individual, circumferentially spaced fluid pressure cylinders in the manner illustrated in the attached drawings is preferred.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A draw bar actuator for use with a machine tool having a rotatable sleevelike spindle rotatably supported on a housing and an elongated draw bar slidably supported within said spindle and axially movable relative thereto, the free end of said draw bar being spaced axially outwardly from the free end of said spindle, and said draw bar actuator being operatively interconnected to said draw bar for causing axial displacement of said draw bar relative to said spindle, comprising the improvement wherein said draw bar actuator includes:

extendible fluid pressure power means for axially displacing said draw bar relative to said spindle;

first antifriction bearing means connected between said spindle and said power means for permitting relative rotation therebetween, said first bearing means including relatively rotatable concentric inner and outer bearing races, said inner bearing race being nonrotatably connected to said spindle;

second antifriction bearing means axially spaced from said first bearing means and operatively connected between said draw bar and said power means for permitting relative rotation therebetween, said second bearing means including relatively rotatable concentric inner and outer races, said inner race being nonrotatably connected to said draw bar;

said power means including nonrotatable cylinder means disposed axially between said first and second bearing means and positioned in surrounding relationship to said draw bar, said cylinder means being fixedly connected to the outer race of one of said bearing means;

said cylinder means including a pair of spaced end walls and sidewall means fixed to and extending between said end walls for defining substantially closed bore means therebetween;

said power means including piston means slidably supported on said cylinder means within said bore means for linear movement in a direction substantially parallel to the longitudinally extending axis of said spindle; and a plurality of elongated piston rods positioned in spaced relationship to one another and disposed in surrounding relationship to the longitudinal axis of said spindle, one end of each piston rod being fixedly anchored to said piston means, the other end of each piston rod being fixedly connected to the outer race of said other bearing means, and an intermediate portion of each piston rod being slidably and sealingly supported on and extending through one of said end walls.

2. An actuator according to claim 1, wherein said plurality of piston rods extend through and are slidably and sealingly supported solely by said one end wall, said piston rods being free of support by said other end wall.

3. An actuator according to claim 1, wherein said sidewall means includes opposed sidewall portions defining opposed parts of the periphery of said bore means, one of said opposed sidewall portions being disposed closely adjacent the outer periphery of said draw bar, and the other sidewall portion being spaced radially outwardly a substantial distance from the periphery of said draw bar while being disposed to face said one sidewall portion so as to define at least a portion of said bore means therebetween, said first and second sidewall portions each being rigidly interconnected between said first and second end walls.

4. An actuator according to claim 1, wherein the bore means formed in said cylinder means includes a plurality of circumferentially spaced, axially extending bores, and said piston means including a piston individually slidably disposed within each of said bores, one of said piston rods being fixedly connected to each of said pistons.

5. An actuator according to claim 4, wherein said cylinder means is fixedly connected to the outer race of said first bearing means, and wherein said piston rods are fixedly connected to the outer race of said second bearing means.

* * * * *